March 17, 1964 F. C. MOCK 3,124,931
MOTIVE FLUID CONTROL FOR A RE-EXPANSION GAS TURBINE ENGINE
Filed May 2, 1960 15 Sheets-Sheet 1

INVENTOR.
FRANK C. MOCK.
BY
ATTORNEY

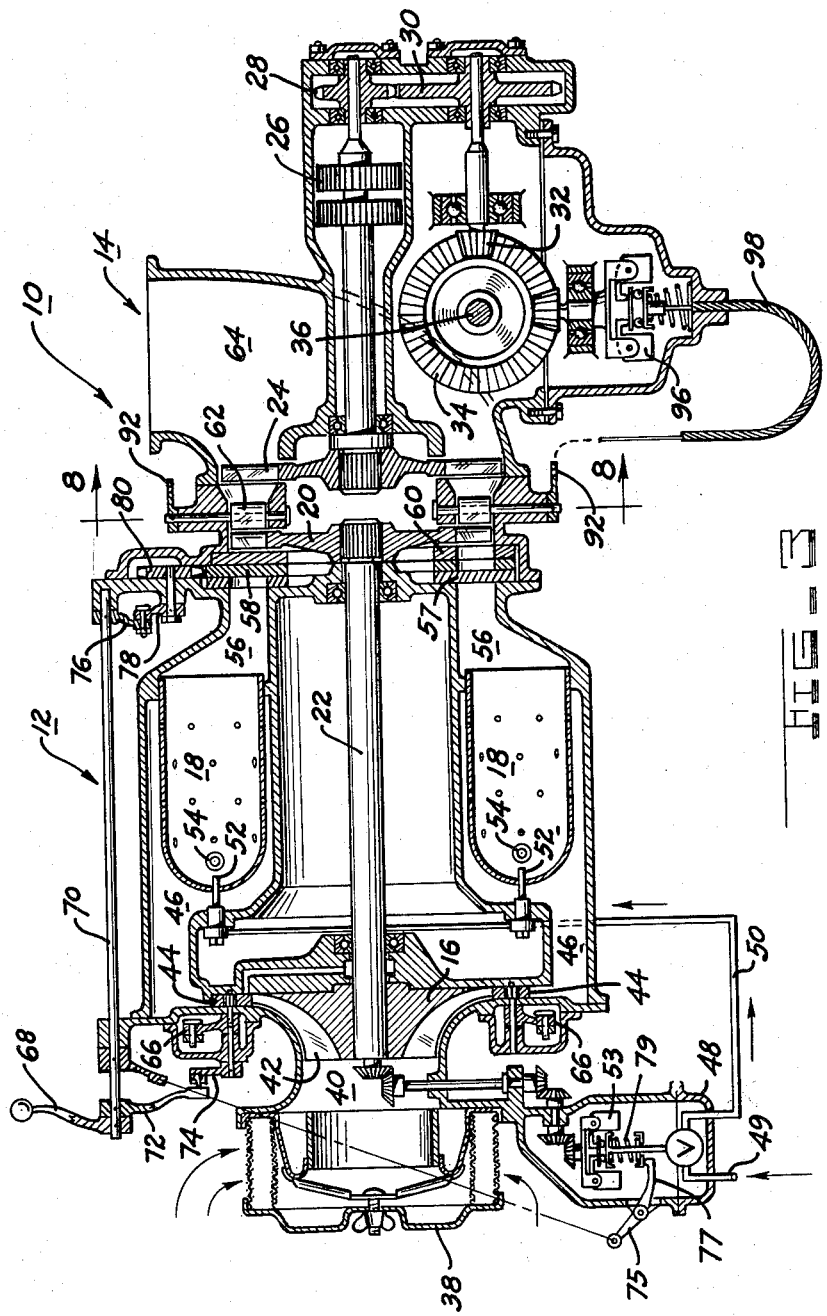

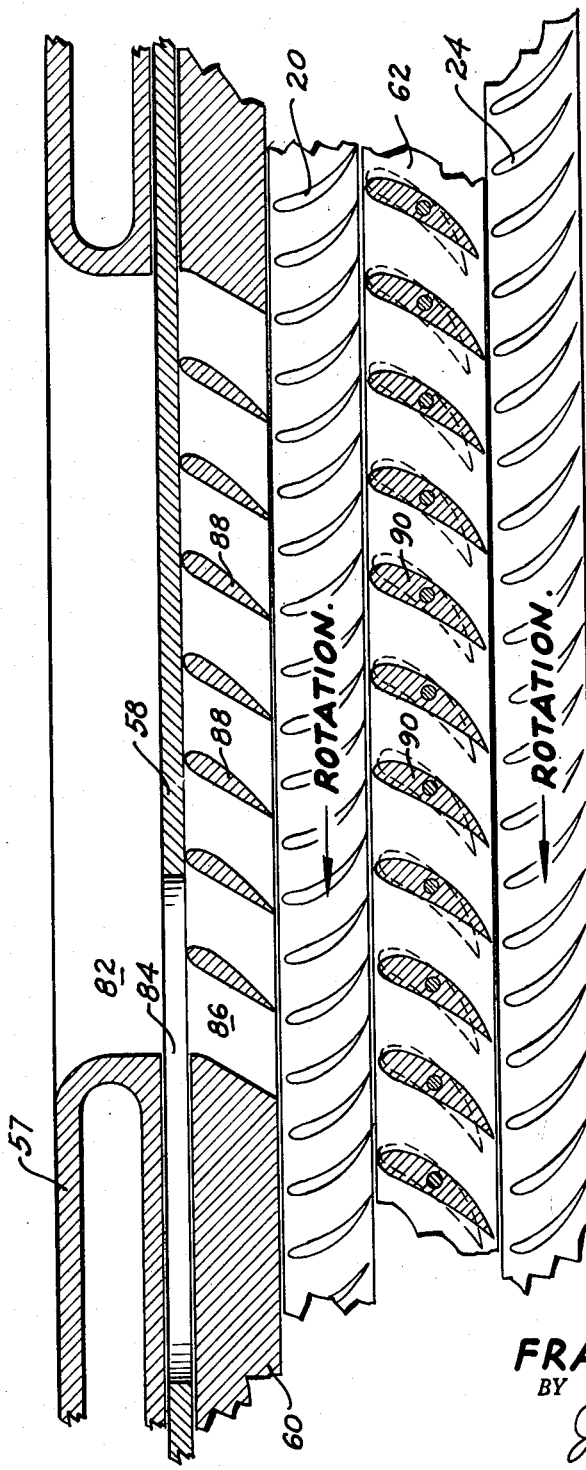

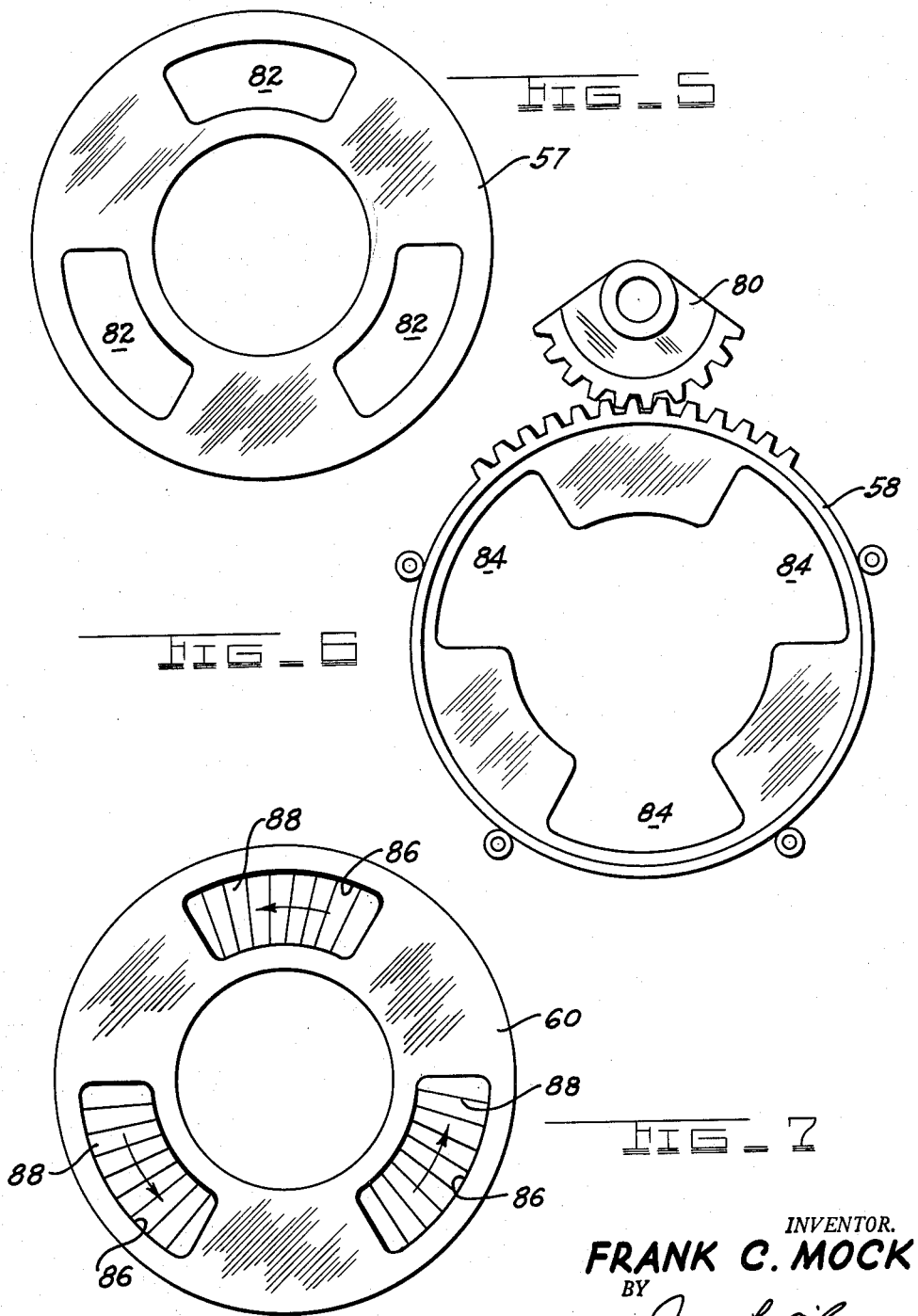

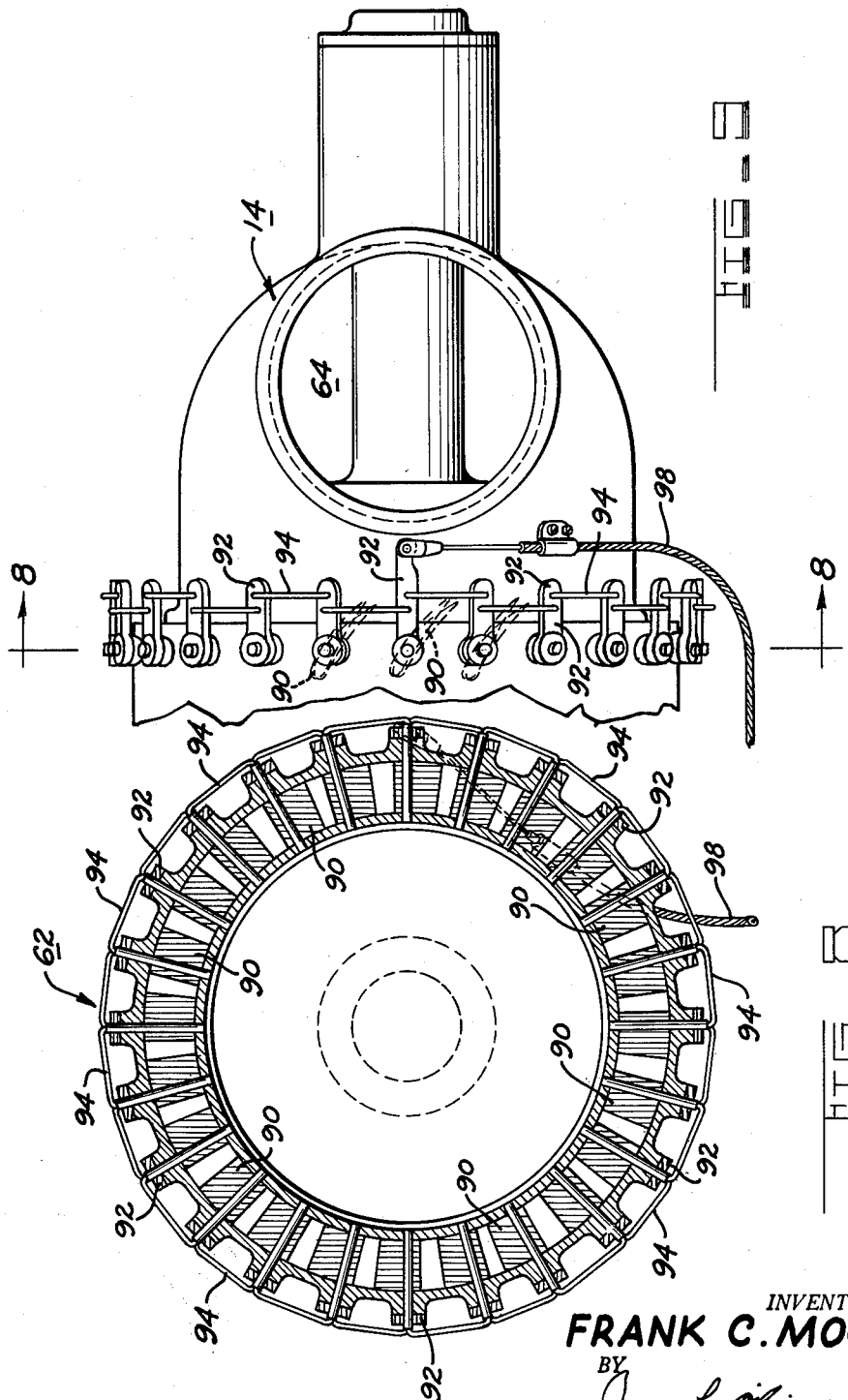

March 17, 1964 F. C. MOCK 3,124,931
MOTIVE FLUID CONTROL FOR A RE-EXPANSION GAS TURBINE ENGINE
Filed May 2, 1960 15 Sheets-Sheet 6
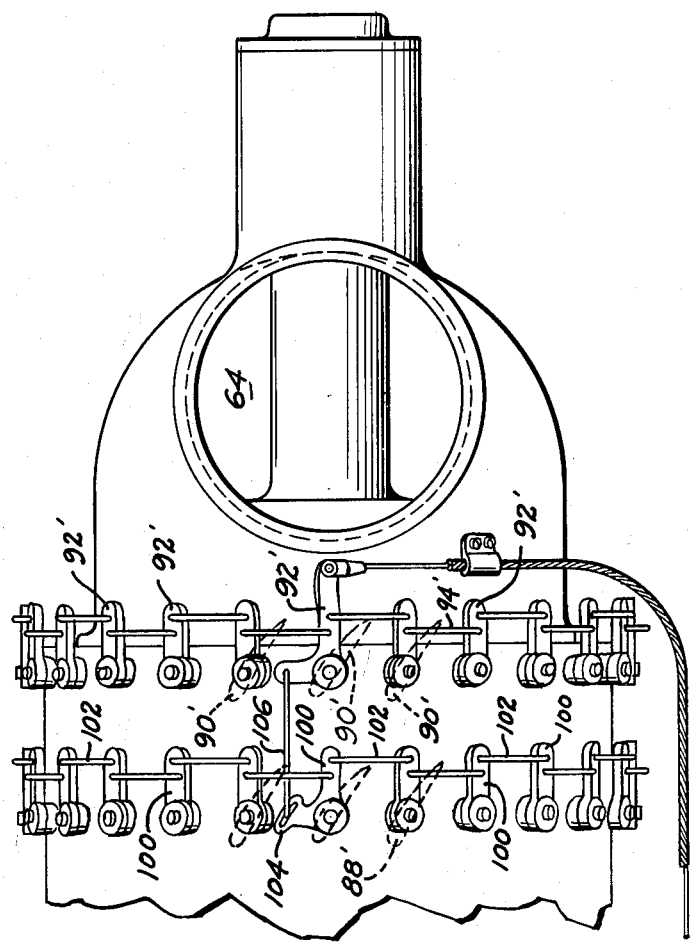
INVENTOR.
FRANK C. MOCK
BY
ATTORNEY.

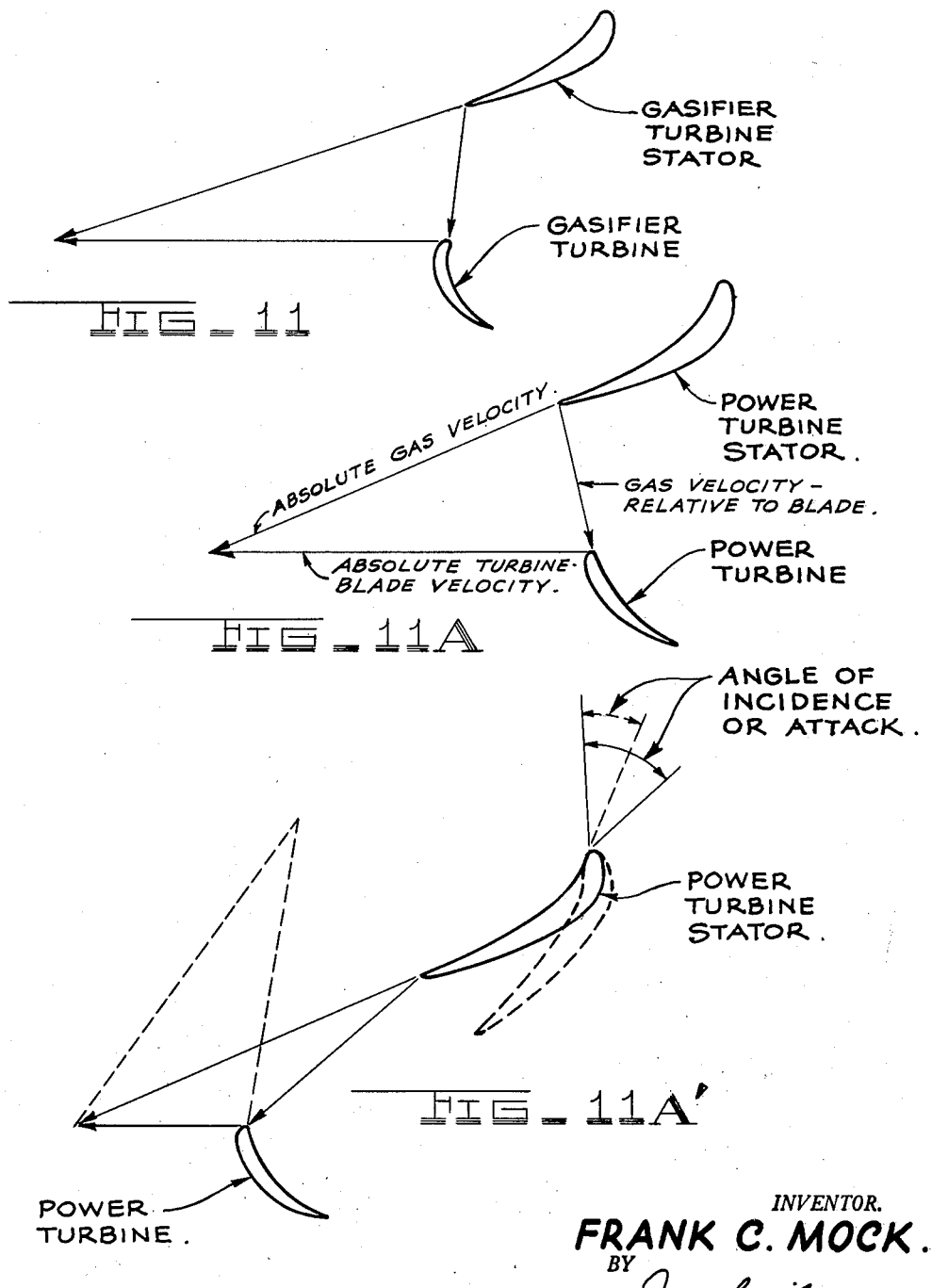

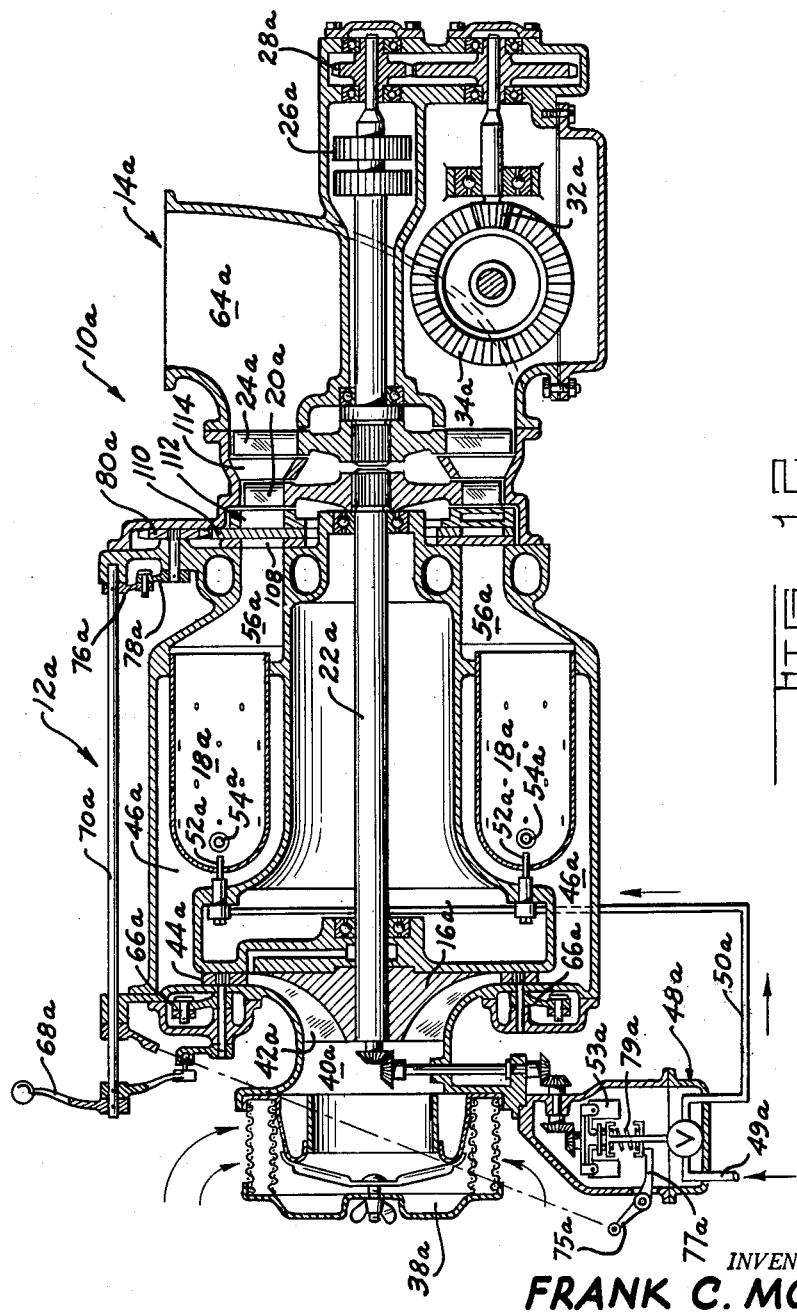

March 17, 1964 F. C. MOCK 3,124,931
MOTIVE FLUID CONTROL FOR A RE-EXPANSION GAS TURBINE ENGINE
Filed May 2, 1960 15 Sheets-Sheet 9
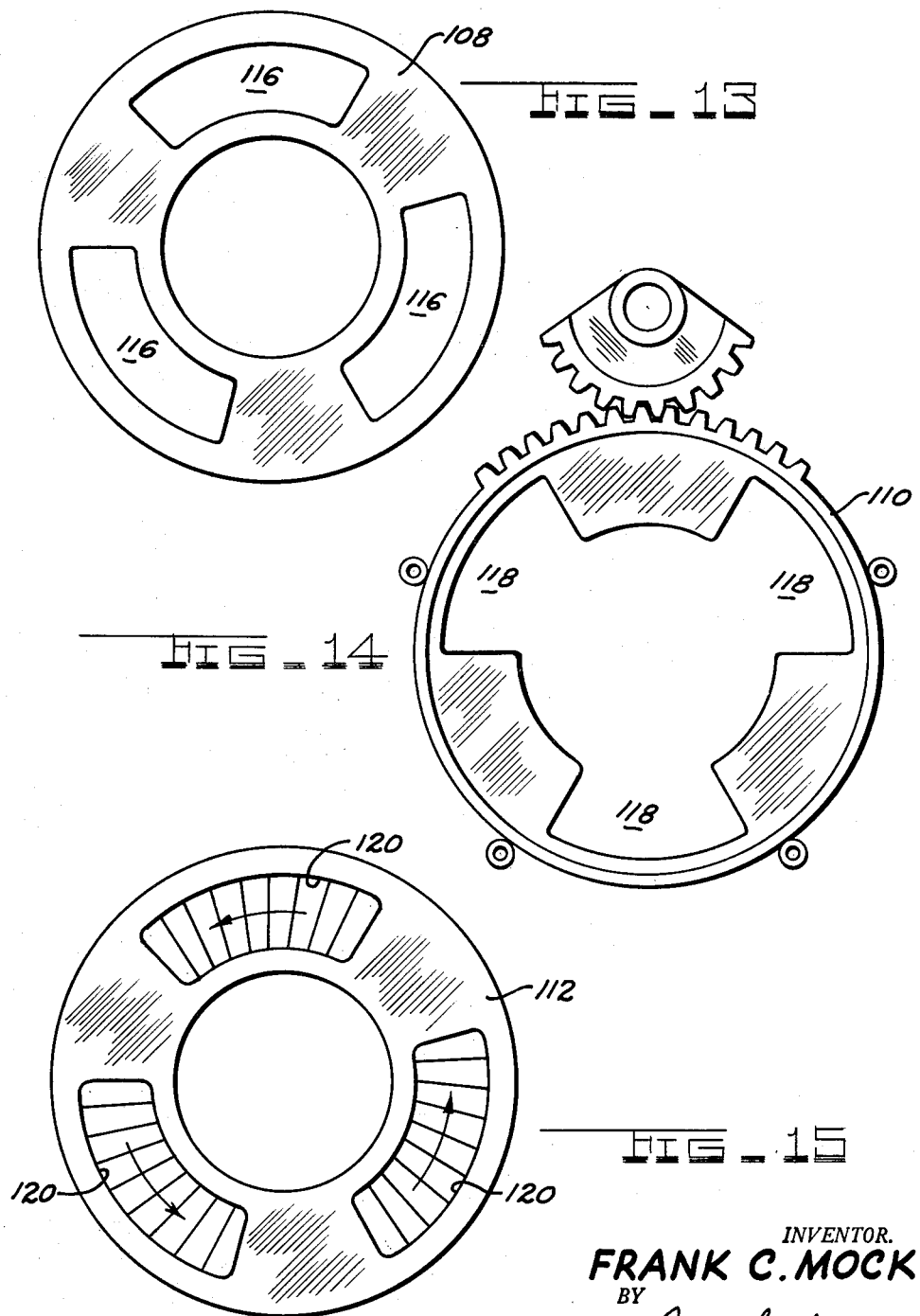
INVENTOR.
FRANK C. MOCK.
BY
James L. O'Brien
ATTORNEY.

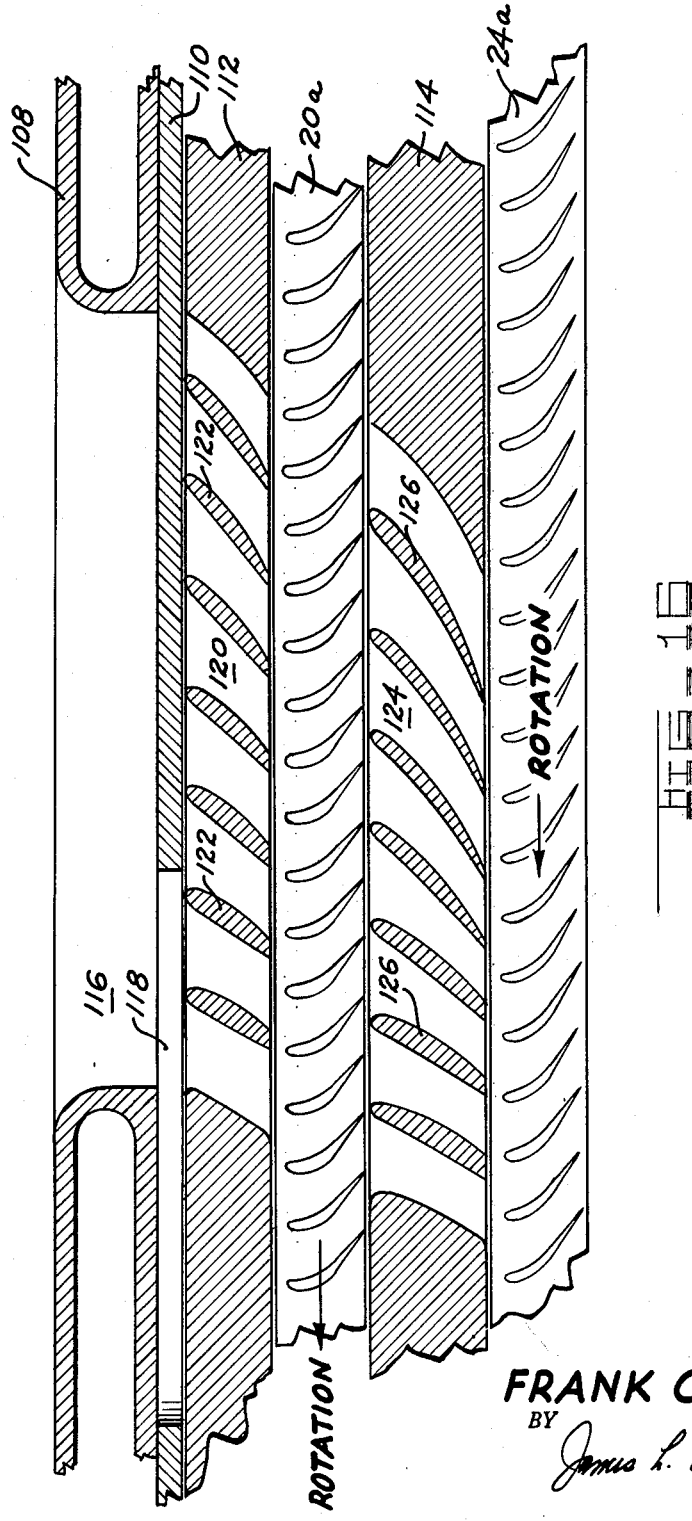

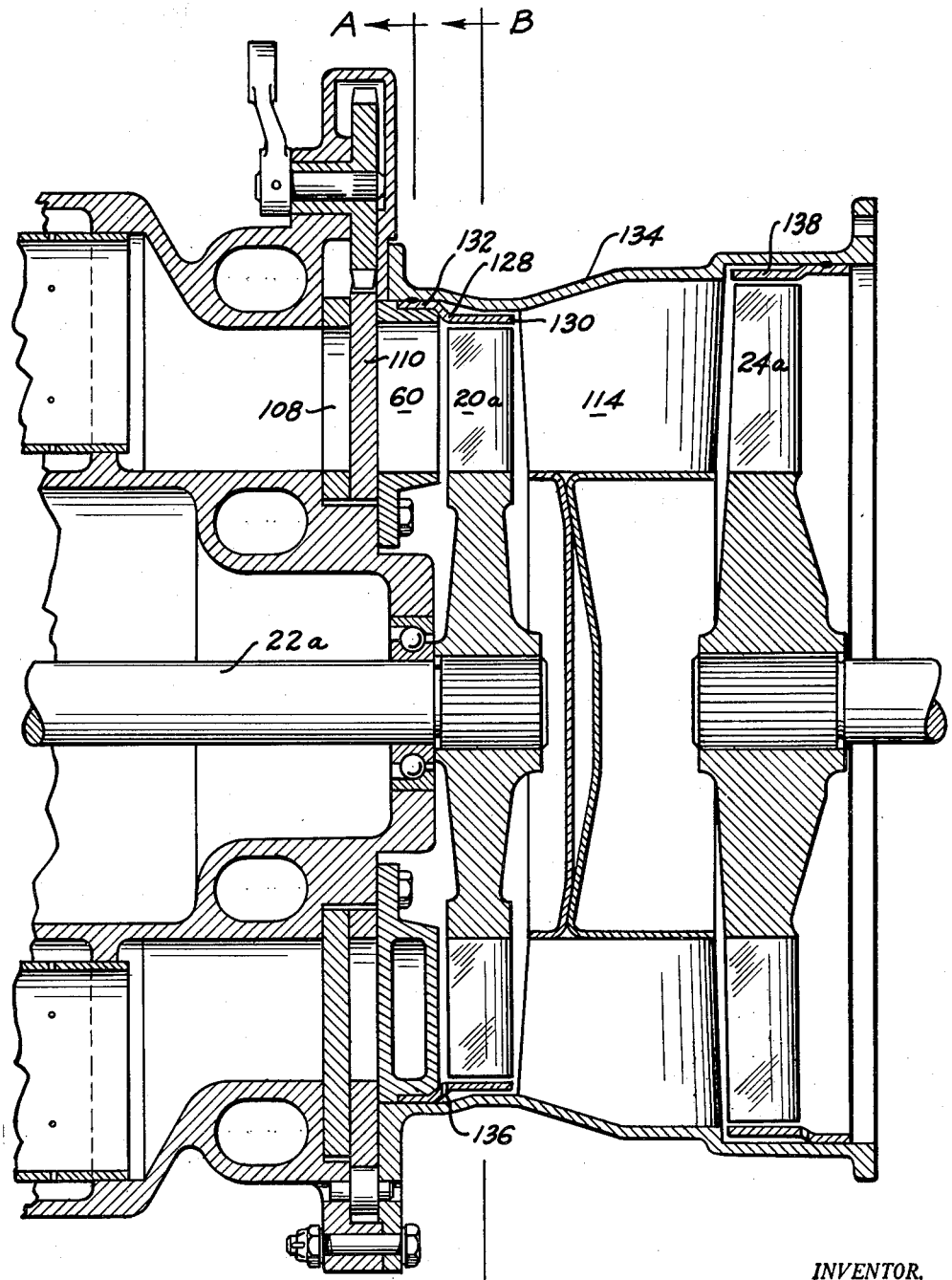
FIG_17

March 17, 1964 F. C. MOCK 3,124,931
MOTIVE FLUID CONTROL FOR A RE-EXPANSION GAS TURBINE ENGINE
Filed May 2, 1960 15 Sheets-Sheet 12
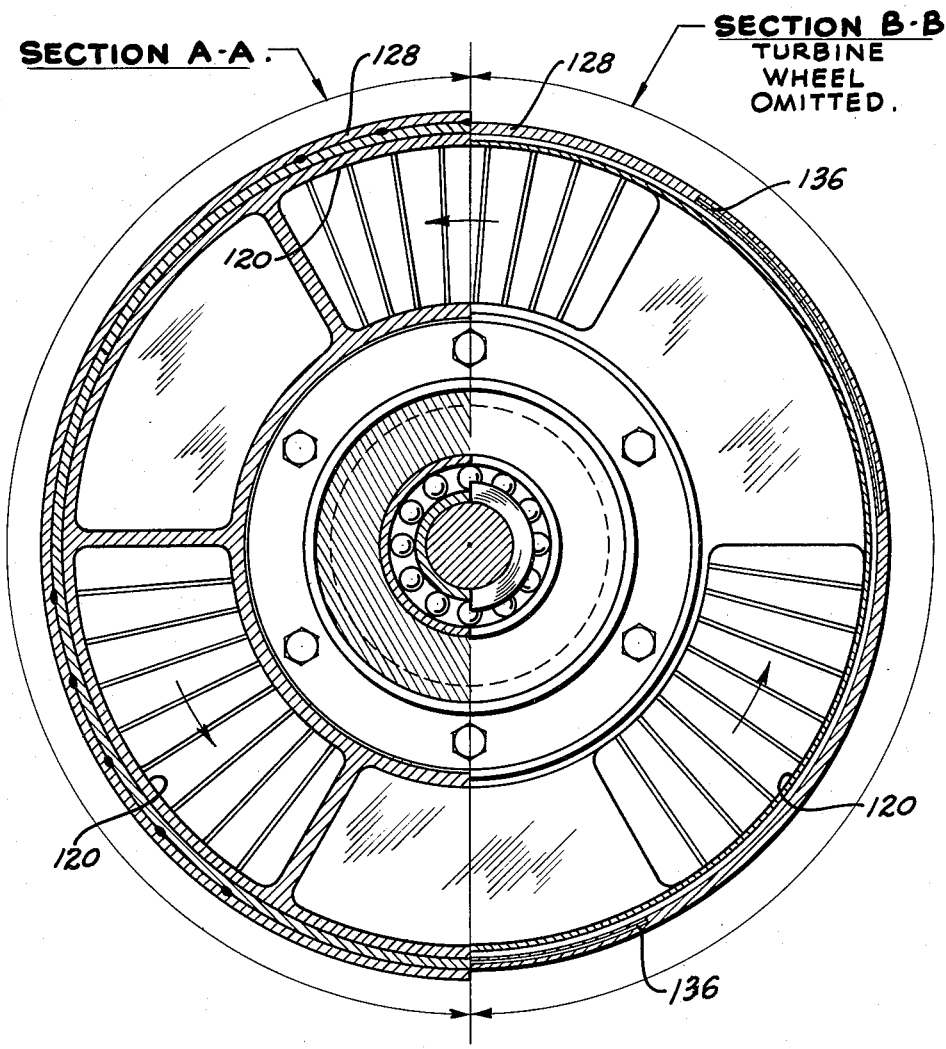
FIG_13
INVENTOR.
FRANK C. MOCK.
BY
*James L. O'Brien*
ATTORNEY.

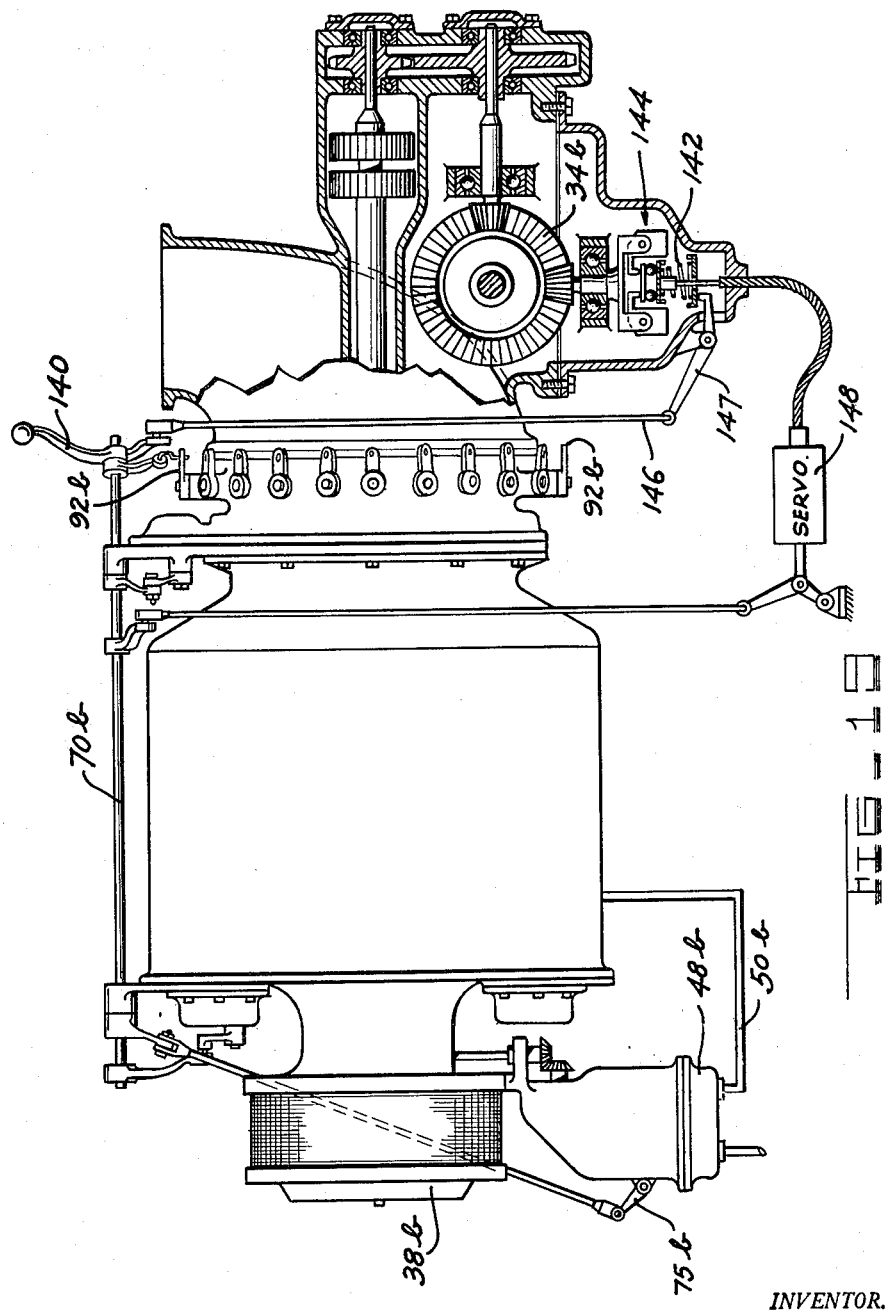

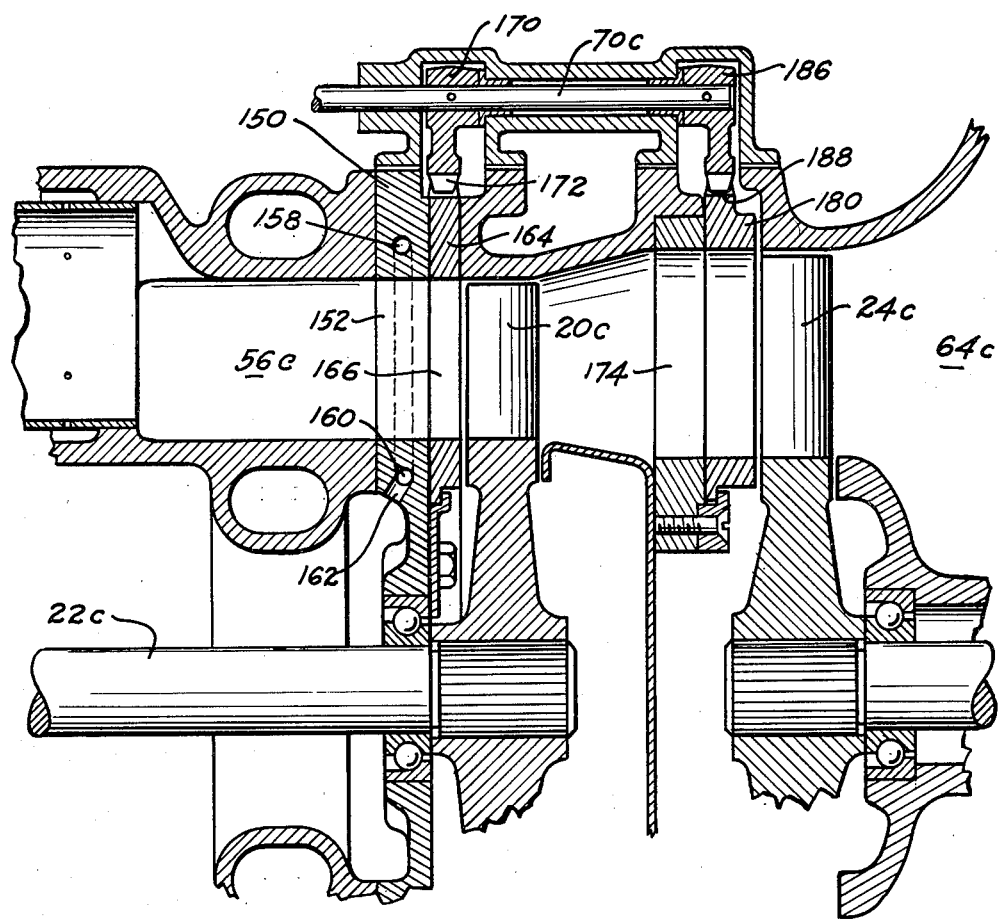
FIG_20
INVENTOR.
FRANK C. MOCK.
BY
*James L. O'Brien*
ATTORNEY.

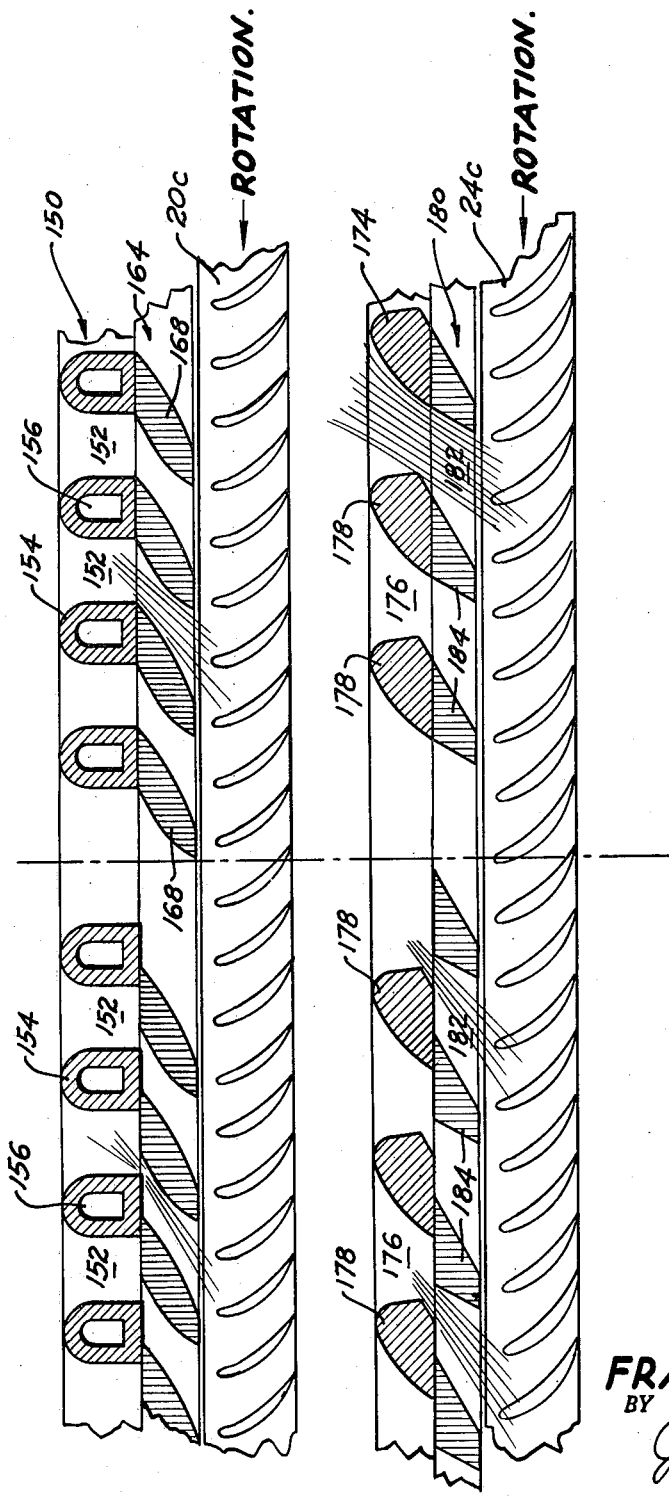

United States Patent Office 3,124,931
Patented Mar. 17, 1964

3,124,931
MOTIVE FLUID CONTROL FOR A RE-EXPANSION
GAS TURBINE ENGINE
Frank C. Mock, South Bend, Ind., assignor to The Bendix
Corporation, a corporation of Delaware
Filed May 2, 1960, Ser. No. 26,062
6 Claims. (Cl. 60—39.25)

The present invention relates generally to gas turbine engines and more particularly to such engines having a gasifier section for producing gas to drive a power section at varying speeds and/or loads.

In the ordinary gas turbine engine the power output of the engine is controlled by varying the speed of the gasifier section by control of the fuel supply thereto. The ordinary gas turbine engine is not, however, adapted for responsive, economical operation over a wide range of speeds and/or loads. My copending applications U.S. Serial No. 780,531, filed December 15, 1958, now Patent No. 3,025,668, and U.S. Serial No. 850,819, filed November 14, 1959, now Patent No. 3,066,488, disclose and claim improvements in gas turbine engines wherein the volume flow of gas through the engine is controlled in conjunction with control of the fuel supply so that the responsiveness and economy of operation of the engine through a wide range of loads is improved.

In some applications, however, further improvements over my previous inventions are desirable to enable the gas turbine engine to compete favorably with other types of powerplants. An example of such an application is a powerplant for an automobile wherein about 5 H.P. is required for travel at legal speeds in cities while 100 H.P. or more is required for open country traveling. Since a major portion of automobile traffic is in the city, it is of major importance that the low speed and/or load operation of the automobile powerplant be responsive and economical. The importance of responsive and economical operation of an engine at speeds and/or loads less than maximum, is, of course, not limited to automotive powerplants but extends as well to powerplants for other uses such as for aircraft, marine vehicles, and stationary powerplants.

It is a principal object of the present invention to improve the economy of operation of a gas turbine engine at speeds and/or loads less than maximum.

It is a further object of the present invention to maintain the efficiency of the power turbine over a wide range of power turbine speeds and gas flows.

It is another object of the invention to provide an improved sealing means for a gas turbine engine.

It is still another object of the invention to maintain the direction of gas flow relative to the turbine blades within predetermined limits throughout a wide range of turbine speeds.

These and other objects and advantages of the present invention will become readily apparent from the following detailed description taken in connection with the appended drawings wherein:

FIGURE 3 is a longitudinal sectional view of a gas turbine engine embodying the present invention;

FIGURE 4 is a developed view of a portion of the engine of FIGURE 3 showing the gasifier power stators and turbines;

FIGURES 5, 6 and 7 are plan views respectively of the plate, throttle and gasifier stator shown in FIGURE 4;

FIGURE 8 is a sectional view taken along line 8—8 of FIGURE 3;

FIGURE 9 is a fragmentary top view of the engine shown in FIGURE 3;

FIGURE 10 is a view similar to FIGURE 9 showing another embodiment of the invention;

FIGURES 11, 11A and 11A′ represent vector analysis of gas flow through portions of the engine;

FIGURE 12 is a longitudinal sectional view of a gas turbine engine showing another embodiment of the present invention;

FIGURES 13, 14 and 15 are plan views respectively of the plate, throttle and gasifier stator shown in FIGURE 12;

FIGURE 16 is a developed view of a portion of the engine of FIGURE 12 showing the gasifier and power stators and turbines;

FIGURE 17 is an enlarged view of a portion of FIGURE 12;

FIGURE 18 is a composite split sectional view taken along lines 18A—A and 18B—B of FIGURE 17;

FIGURE 19 is a view of an engine similar to the engine of FIGURE 3 showing another embodiment of the invention;

FIGURE 20 is a fragmentary view of an engine similar to the engine of FIGURE 12 showing still another embodiment of the invention; and FIGURE 21 is a developed view of the turbines and throttle-guide vanes of FIGURE 20.

Figure 1:
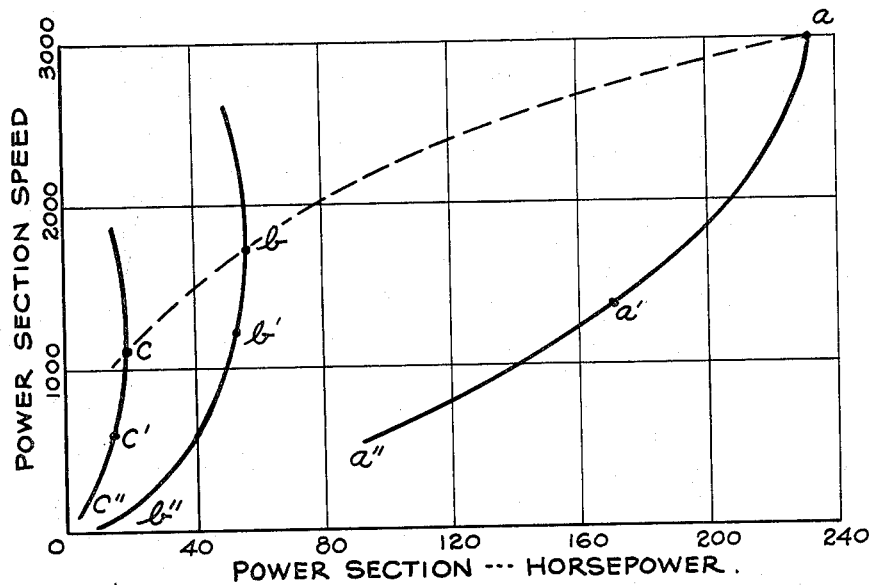
FIGURES 1 and 2 are graphs showing various operating conditions of an ordinary gas turbine engine and a gas turbine engine embodying the present invention.

Referring now to the drawings, FIGURE 1 shows a series of operating curves for an ordinary gas turbine engine having a gasifier section which supplies gas to drive a power section. The curves $a$—$a''$, $b$—$b''$ and $c$—$c''$ of FIGURE 1 represent power section speed vs. power section horsepower output at constant gasifier speeds of 36,000 r.p.m., 27,500 r.p.m. and 21,000 r.p.m. respectively. The dashed line of FIGURE 1 represents a line of maximum efficiencies for the ordinary type gas turbine engine. For the ordinary gas turbine engine represented in FIGURE 1, constant gas generator speed requires constant fuel flow. Thus it can be readily appreciated that operation of the engine from $a$ to $a''$ where the output of the power section decreases from 232 H.P. to 94 H.P. and the fuel flow remains constant results in increasing specific fuel consumption. This is shown graphically in FIGURE 2.

Figure 2:
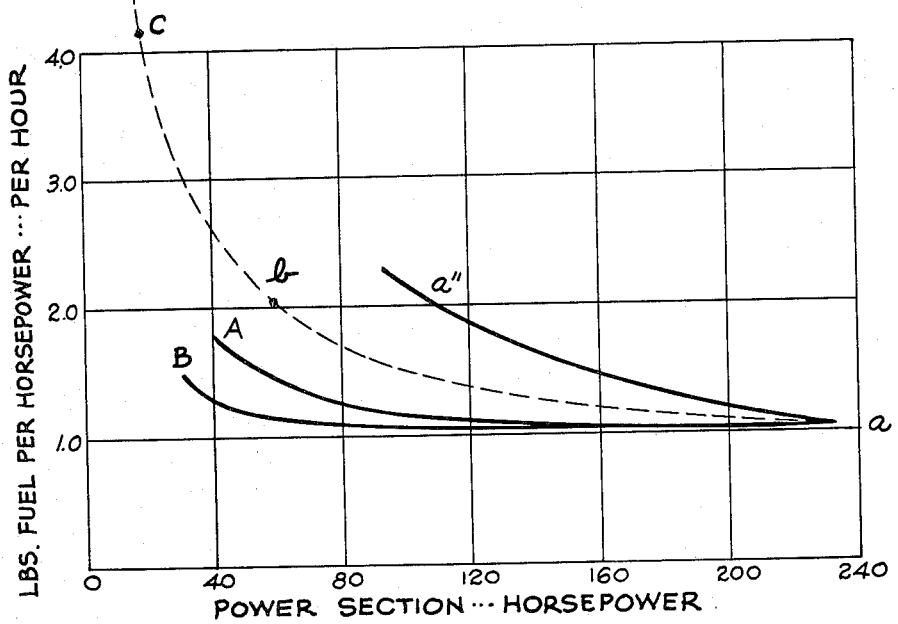

By varying the gasifier speed with variations in the power section speed to obtain the efficiencies represented by the dashed line in FIGURE 1, the specific fuel consumption may be improved over operation along the constant gasifier speed curve $a$—$a''$ as is shown by the dashed line $a$—$b$—$c$ of FIGURE 2. Further improvement in the specific fuel consumption may be obtained by coordinated control of gasifier speed and the volume of gas flowing through the gasifier section which improves the thermal efficiency of the engine as disclosed and claimed in my copending patent applications, supra. This improvement is represented by the curve $a$—A in FIGURE 2.

The present invention to be described results in a still further improvement in specific fuel consumption as shown by curve $a$—B in FIGURE 2 by improving the turbine efficiency through directional control of the gas flow to the turbine.

Referring now to FIGURE 3, numeral 10 designates a gas turbine engine having a gasifier section 12 and a power section 14. Gasifier section 12 includes a compressor 16, combustion chambers 18 and a turbine 20 which drives compressor 16 through a shaft 22. The power section 14 includes a turbine 24, clutch 26, transmission gearing 28, 30, 32 and 34 and a drive shaft 36 for driving a load such as automobile wheels, aircraft or marine propellers etc. (not shown).

Air flows into the engine through a filter 38 and duct 40 to the inlet 42 of compressor 16. Air is discharged from the compressor through movable throttle vanes 44 into an annular duct 46 and thence into combustion chambers 18. Fuel is supplied from a source, not shown, to a fuel control 48 through a conduit 49 and thence by means of conduit 50 to nozzles 52 mounted to discharge into combustion chambers 18. A governor 53 driven by the gasifier section controls the fuel flow through conduit 50 as a function of gasifier speed. Igniter plugs 54 are disposed adjacent nozzles 52 and are energized by suitable means, not shown, to ignite the fuel discharged from nozzles 52. The products of combustion or gases are discharged from combustion chambers 18 through an annular duct 56, plate-like member 57, throttle 58 and stator 60 to drive turbine 20.

The gas discharged from the gasifier section passes through a stator 62 and power turbine 24 for ultimate discharge through the exhaust pipe 64.

Throttle vanes 44 are connected by a linkage 66 for simultaneous rotation when actuated by manual control lever 68 through shaft 70, cam 72 and lever 74. Governor 53 is controlled by means of manual lever 68, shaft 70, and lever 75 which rotates lever 77 to adjust the governor spring 79.

The turbine throttle 58 is rotated to vary the flow area of the gasifier turbine 20 by means of manual control lever 68, shaft 70, cam 76, lever 78 and gear segment 80.

As best seen in FIGURES 4 through 7, plate 57, throttles 58 and stator 60 are respectively formed with spaced openings or arcuate slots 82, 84 and 86. A plurality of guide vanes 88 are mounted in each opening 86 of stator 60. The openings 82 and 86 in plate 57 and stator 60 respectively are maintained in alignment. The throttle 58 is rotated between plate 57 and stator 60 so as to vary the registration of openings 84 with openings 82 and 86 and thereby vary the flow area of the gasifier turbine.

As best seen in FIGURES 4, 8 and 9 stator 62 is provided with a plurality of pivotally mounted guide vanes 90 which are connected by means of levers 92 and links 94 for simultaneous rotation about their pivots. A governor or speed responsive device 96 (FIGURE 3) is driven by gear 34 as a function of the speed of power turbine 24 to rotate guide vanes 90 through a Bowden wire 98 is connected to one of the levers 92. The guide vanes 88 in stator 60 may be fixed or they may be rotatable. In the embodiment shown in FIGURE 10 wherein parts similar to those previously described are designated by similar numbers primed, guide vanes 88' are pivotally mounted with the vanes 88' in each opening 86' connected by means of levers 100 and links 102 for simultaneous rotation. One lever 100 in each opening group of guide vanes 88' is connected by means of a cam 104 and a link 106 to a lever 92' whereby the guide vanes 88' are coordinately actuated by and in predetermined relationship to guide vanes 90'.

In the embodiments shown in FIGURES 1 through 10 the guide vanes 90 and/or 88' are rotated to increase the angle of incidence of the vanes with respect to the direction of gas flow striking the vanes with increasing power turbine speed and vice versa.

FIGURES 11, 11A and 11A' show a vector analysis of the gas flow through the gasifier and power stators and turbines of an ordinary gas turbine engine of the type represented in FIGURE 1 operating along curve a—a". In the description of FIGURE 1 it will be noted that for operation along line a—b—c, the gasifier speed would diminish along with the horsepower; i.e. along with the airflow: hence, there generally would not be much change in the vector angles of FIGURE 11 with changes in gasifier speed. However, certain scheduled relations may be obtained by the device of my FIGURE 10 as desired. FIGURE 11A represents the operating condition of the power turbine at "a" in FIGURE 1 wherein the gasifier speed is constant at 36,000 r.p.m. and the power turbine speed is about 29,400 r.p.m. FIGURE 11A' represents the operating condition at "a'" in FIGURE 1 wherein the gasifier speed is still constant at 36,000 r.p.m. but the power turbine speed has been reduced to 13,720 r.p.m.

Comparing FIGURE 11A with FIGURE 11A' it will be noted that the gas vector striking the power turbine blade has shifted to a point where the gas striking the blade will produce turbulence or eddies and cause inefficient operation of the turbine. Rotation of the power turbine stator guide vanes 90 to the position shown by the dotted lines in FIGURE 11A' decreases the angle of incidence of the vanes with respect to the direction of gas flow striking the vanes thereby restoring the direction of the gas vector striking the power turbine blade within the limits for efficient operation. The limits for efficient operation depend on the shape of the air foil used on the turbine blades.

For the most efficient operation the guide vanes 90 should be rotated as a function of power turbine speed, as described above. However, in some applications the governor 96 may be eliminated and the Bowden wire 98 actuated manually to rotate the guide vanes 90.

Referring now to the embodiment shown in FIGURE 12, the gas turbine engine shown therein from the inlet to the ends of the combustion chambers is similar to the embodiment shown in FIGURE 3 and similar parts will be designated by similar numerals suffixed by the letter "a" without further description.

Gas is discharged from combustion chambers 18a into annular duct 56a thence through plate or member 108, throttle 110, gasifier stator 112, gasifier turbine 20a, power section stator 114, power turbine 24a to the exhaust pipe 64a. As best seen in FIGURES 13 through 15, plate 108, throttle 110 and stator 112 are formed with a plurality of spaced openings or arcuate slots designated respectively 116, 118 and 120. Slots 116 and 120 are of the same size and are positioned in axial alignment. Openings 118 in throttle 110 are shorter or of less arcuate length than the slots 116 and 120. As the throttle 110 is rotated between member 108 and stator 112 the openings 118 are brought into variable registration with slots 116 and 120 to control the effective flow area therethrough.

As shown in FIGURE 16 the throttle 110 is positioned with the openings 118 in its minimum flow area position. Rotation of throttle 110 clockwise or toward the right as viewed in FIGURE 16 increases the flow area. In the extreme clockwise position of throttle 110 the right hand edge of opening 118 registers with the right hand edges of slots 116 and 120 as viewed in FIGURE 16. In the extreme clockwise position of throttle 110 the left portions of slots 116 and 120 corresponding to the minimum flow area is blanked off by the throttle. Thus rotation of the throttle 110 in a clockwise direction not only increases the flow area but also causes the flow area to shift to the right or clockwise as viewed in FIGURE 16.

A plurality of fixed guide vanes 122 are disposed in stator opening 120 and are formed with clockwise progressively increasing angles of attack or incidence with respect to the direction of gas flow through the flow area. Each of the vanes may be formed with progressively varied angles of attack or the vanes may be grouped with the angles of attack varied in progressive groups. The latter construction is shown in FIGURE 16 wherein in a clockwise direction the first four vanes are in one group with identical angles of incidence and the next three vanes are in a second group with identical angles of incidence greater than the angles of incidence of the vanes in the first group. Rotation of throttle 110 in a clockwise direction progressively increases the flow area to a maximum and progressively exposes the respective guide vanes 122 to gas flow whereby with increasing gas flow or throttle opening the guide vane angles of incidence are increased.

The power section stator 114 is formed with an opening 124 in which are mounted fixed guide vanes 126 having progressively varied angles of attack or angles of incidence with respect to the direction of gas flow sticking the vanes. The effect of rotation of throttle 110 is similar with respect to guide vanes 126 as it was to guide vanes 122. In some applications, particularly where the gasifier speed does not vary through a wide range the guide vanes 122 in the gasifier stator may all have the same angle of attack and only the guide vanes 126 need be formed with progressively varied angles of attack.

The use of stators having spaced openings with solid portions therebetween creates a problem of thermal expansion variations in the engine under some conditions which interferes with the clearance of the rotating turbines with respect to their peripheral sealing means. As best seen in FIGURES 17 and 18, I have provided a novel sealing means for the peripheries of the gasifier and power turbines which provides for equal circumferential thermal expansion during operation of the engine. Numeral 128 designates a sealing ring having a portion 130 surrounding the periphery of the gasifier turbine 20 and a portion 132 which is secured to the casing 134 of the engine 10. The portion 132 is secured as by welding at spaced intervals aligned with the openings 116 and 120 in member 108 and stator 112 respectively. Intermediate the openings 116, the sealing ring 128 is provided with a slot 136 which separates the portions 130 and 132. The portions of ring 130 adjacent slots 136 are posterior to blank portions of stator 114 and are therefore not subjected to the same heat as the portions 130 adjacent the sealing means and in alignment with the openings 120 of stator 114. The slots 136 permit the portions 130 adjacent thereto to expand equally with the portions 130 adjacent the sealing means which are subjected to higher temperatures. My improved sealing ring 128 thus maintains its clearance from the periphery of the turbine and thereby maintains the efficiency of the turbine. A sealing ring 138 of construction identical to the construction of ring 128 is provided to seal the periphery of the power turbine 24a.

In the embodiment shown in FIGURE 19, the gas turbine engine is generally similar to the engine shown in FIGURE 3 and similar parts are designated by similar numerals suffixed by the letter "b" without further explanation. In FIGURE 19 a manual control lever 140 is connected to one of the levers 92b to adjust the position of guide vanes 90b and to regulate the governor spring 142 of governor 144 by means of a rod 146 and lever 147. Governor 144 is driven by gear 34b as a function of power turbine speed and actuates a servo system 148 which in turn rotates shaft 70b to regulate the fuel control 48b, and the compressor and turbine throttles.

In FIGURE 19 the manual control 140 may directly adjust governor 144 and the servo system 148 may then regulate both lever 92b and shaft 70b.

Referring now to the embodiment shown in FIGURES 20 and 21, the engine is similar to the engine shown in FIGURE 12 except for the turbine section and similar parts will be designated by similar numbers suffixed by the letter "c." Numeral 150 designates a stator or stationary plate-like member formed with an annular opening 152 which is in registration with annular duct 56c. A plurality of radially extending spokes or vanes 154 secured to or formed integrally with member 150, span the opening 152 and are circumferentially equally spaced therein. Each of the vanes 154 is provided with a central longitudinal bore 156 which are connected at opposite ends to annular passages 158 and 160 for the transmission of cooling fluid which is received through passage 162. A rotatable member 164 is mounted immediately downstream of stationary member 150 and is provided with an annular opening 166 which is in registration with opening 152. A plurality of radially extending vanes 168, secured to or formed integrally with member 164, span opening 166 and are circumferentially spaced so that in the open position vanes 168 are in registration with vanes 154. A segmented gear 170 secured to shaft 70c engages gear teeth 172 formed in the periphery of member 164 so that rotation of shaft 70c causes vanes 168 to move from the open position, shown to the right of the dash-dot line of FIGURE 21, to the partially closed position, shown to the left of the dash-dot line. The rotation of vanes 168 not only decreases the flow area for the gas flowing to gasifier turbine 20c but also increases the angle of the gas discharged from the vanes with respect to the blades of the turbine 20c as the flow area is decreased. The resultant vector of gas flow striking the turbine blades is thus maintained within predetermined angular limits. It is desirable that the length of the vanes 154 and 168 in the direction parallel to the axis of rotation of the engine be as small as possible consistent with providing sufficient surface to deflect the airflow to create the desired angle of attack. If the axial length of the vanes 154 and 168 is too great the passage of turbine 20c may create eddies and turbulence with appreciable loss of efficiency.

A stator or stationary plate like member 174 is mounted upstream of turbine 24c and is provided with an annular opening 176 in alignment with openings 152 and 166. A plurality of radially extending vanes 178, secured to or formed integrally with member 174, span opening 176. A rotatable member 180 is mounted immediately downstream of member 174 and is provided with an annular opening 182 in registration with opening 176. A plurality of radially extending vanes 184 are mounted in opening 182. In the open position, shown to the right of the dot-dash line of FIGURE 21, vanes 184 are in registration with vanes 178. As member 180 is rotated toward the closed position the vanes 184 are moved to the position shown to the left of the dot-dash line in FIGURE 21. Member 180 is rotated by means of a gear segment 186 which meshes with gear teeth 188 formed on the periphery of member 180. Gear segment 186 is secured to shaft 70c for actuation thereby. Rotation of member 180 changes the flow area and the direction of flow of the gas in a manner similar to that described above in connection with members 150 and 164.

While I have herein illustrated preferred embodiments of my invention it readily will be understood that numerous changes and modifications and substitutions of equivalents may be made therein without departing from the spirit and scope of my invention.

I claim:

1. In a gas turbine engine having a gasifier section and a rotational independent power turbine driven by gas supplied from said gasifier section, guide vane means disposed between said gasifier section and said power turbine, said guide vane means being movable for changing the direction of the gas leaving said guide vane means, and speed responsive means driven by said power turbine operatively connected to said guide vane means for progressively moving said guide vane means solely as a function of power turbine speed to maintain that gas angle of attack with respect to said power turbine which provides optimum efficiency for all power turbine speeds.

2. In a gas turbine engine having a gasifier section and a power turbine driven by gas supplied from said gasifier section, movable means mounted in said engine between said gasifier section and said power turbine for controlling the direction of the gas flowing to said power turbine and means responsive to power turbine speed operatively connected to said movable means to progressively position said movable means in response to power turbine speed for controlling that gas angle of attack with respect to said power turbine which provides best efficiency for all power turbine speeds.

3. In a gas turbine engine having a gasifier section and a power turbine driven by gas supplied from said gasifier section, a plurality of guide vanes rotatably mounted between said gasifier section and said power turbine to control the direction of the gas striking said power turbine, and means responsive to power turbine speed operatively connected to said guide vanes for progressively rotating said guide vanes in a direction to increase the angle of the vanes with respect to the direction of gas flow striking the vanes with progressively increasing power turbine speed to maintain optimum efficiency for all power turbine speeds.

4. In a gas turbine engine having a gasifier section including a compressor, a first turbine driving said compressor, a combustion chamber into which air from the compressor is delivered and from which gas is delivered to said first turbine, and a fuel system for supplying fuel to said combustion chamber, and a power section including a second turbine driven by gas discharged from said gasifier section, first throttle means controlling the flow through said compressor, second throttle means controlling the flow to said first turbine, governor means responsive to first turbine speed for controlling said fuel system, manual means for coordinately controlling said first and second throttle means and said governor means, movable guide vane means upstream of said second turbine for controlling the direction of the gas delivered to said second turbine, and means responsive to second turbine speed for controlling that position of said guide vane means which provides optimum efficiency for all second turbine speed conditions.

5. In a gas turbine engine having a gasifier section and a power turbine driven by gas supplied from said gasifier section, rotatable guide vane means in said engine upstream of said power turbine for controlling the direction of the gas supplied to said power turbine, and means driven as a function of power turbine speed operatively connected to said guide vanes for progressively rotating said guide vanes in a direction to progressively increase the angle of said vanes with respect to the axis of gas flow with increasing power turbine speed to maintain that position of the vanes which provides optimum efficiency for all power turbine speeds, said means constituting the sole control means for said guide vanes.

6. In a gas turbine engine having a gasifier section including a first axial flow turbine and a power section including a second axial flow turbine: a first stator including a plurality of guide vanes for controlling the direction of gas flow to said first turbine, a second stator including a plurality of guide vanes for controlling the direction of gas flow to said second turbine, and means responsive to second turbine speed for progressively rotating the guide vanes in at least one of said stators for varying the angle of gas discharge from said vanes relative to a plane tangent to the gas receiving edge of the turbine immediately downstream of said stator with progressive variations in second turbine speed which provides optimum efficiency for all power turbine speeds.

References Cited in the file of this patent

UNITED STATES PATENTS

| Number | Name | Date |
|---|---|---|
| 2,351,328 | Gent | June 13, 1944 |
| 2,612,757 | Teague | Oct. 7, 1952 |
| 2,613,500 | Lysholm | Oct. 14, 1952 |
| 2,625,789 | Starkey | Jan. 30, 1953 |
| 2,651,493 | Volk | Sept. 8, 1953 |
| 2,715,814 | Barr | Aug. 23, 1955 |
| 2,895,295 | Carlson | July 21, 1959 |
| 2,959,002 | Best | Nov. 8, 1960 |
| 2,988,327 | Trowbridge | June 13, 1961 |